United States Patent [19]

Bullard

[11] 3,841,499

[45] Oct. 15, 1974

[54] WORK TRANSFER APPARATUS

[75] Inventor: Calvin Penfield Bullard, Wilbraham, Mass.

[73] Assignee: Armflex, Inc., East Longmeadow, Mass.

[22] Filed: Oct. 31, 1973

[21] Appl. No.: 411,330

[52] U.S. Cl. .......................... 214/1 BD, 214/147 T
[51] Int. Cl. .............................................. B25j 3/00
[58] Field of Search ..... 214/1 B, 1 BC, 1 BD, 1 BH, 214/1 BV, 147 T

[56] References Cited
UNITED STATES PATENTS

| | | | |
|---|---|---|---|
| 3,354,942 | 11/1967 | Todd et al. | 214/1 BD |
| 3,406,837 | 8/1972 | Winne | 214/1 BC |
| 3,764,022 | 10/1973 | Ishida et al. | 214/1 BD |
| 3,764,023 | 10/1973 | Jatcko | 214/1 BC |
| 3,777,902 | 12/1973 | Potter | 214/1 BD |
| 3,784,031 | 1/1974 | Niitv et al. | 214/1 BC |

OTHER PUBLICATIONS

Western Electric Technical Digest No. 3; July 1966, pgs. 35 & 36, Apparatus for Transferring and Orienting Piece Parts, by Kennedy et al.

*Primary Examiner*—M. Henson Wood, Jr.
*Assistant Examiner*—Gene A. Church
*Attorney, Agent, or Firm*—John F. Carney

[57] ABSTRACT

An automatically actuable work transfer apparatus is described which is operative to remove a workpiece from a work station and to transfer it to a remote receiving station. The apparatus includes plural independent drives operably connected to the respective components for producing compound movements in a work gripping tool. Arrangement of the apparatus components and associated drives is such as to produce rapid, flexible movements in the gripping tool over an extensive work area. The apparatus occupies a minimal amount of space thereby rendering it conducive to direct attachment to a production machine.

11 Claims, 12 Drawing Figures

WORK TRANSFER APPARATUS

BACKGROUND OF THE DISCLOSURE

Considerable concern has been generated in recent times over the physical hazards attendant with the manual manipulation of workpieces into and out of any of a wide variety of production machines such as, for example, cutting machines, press brakes, injection molding presses, and the like. Extensive measures are now required on the part of industry by the Occupational Safety and Health Act to prevent injury to a workman who erroneously positions himself within the position of operation of a production machine. Attempts by industry to comply with the required measures have included means that automatically terminate operation of the production machine whenever the workman positions himself in close proximity to its position of operation. One important drawback of this type of protective measure is that it results in periodic shutdown of the machine thereby disrupting the work cycle. Another drawback is that such measures require complex sensing apparatus and electrical equipment operated thereby, each of which are subject to malfunction. Equipment malfunctions could be of a type that effect spurious shutdown of the machine which is costly from the standpoint of production. Alternatively, the equipment malfunction may be such as to fail to effectively shutdown the machine at the proper time in which case physical harm to the errant workman would result.

Other measures intended to protect a workman operating a hazardous production machine entail the provision of automated mechanical apparatus, commonly known as industrial robots, that are operative to perform the functions of the workman in transferring a workpiece to and/or from the machine thereby completely removing the workman from the dangerous work area. Prior art apparatus of this type are characterized by complex, expensive pieces of equipment that are large in size requiring a considerable amount of floor space adjacent the production machine. They have also been relatively slow in the performance of their operative functions which hampers the rapid cycling of the production machine. All of these deficiencies operate to increase the production costs of workpieces that are manufactured using equipment of the prior art type.

SUMMARY OF THE INVENTION

According to the present invention there is provided improved automatic work transfer apparatus that is characterized by simplicity of form together with speed and flexibility of operation. It is of compact size enabling it, in many applications, to be attached directly to the production machine in conjunction with which it operates.

In essence the apparatus of the present invention includes a sweep arm that is mounted for movement through an arc of travel that enables a gripping tool to move alternately between a work station within the confines of the production machine and a work receiving station remote therefrom. The gripping tool is operatively disposed in such a way with respect to the sweep arm as to be capable of undergoing both linear and radial movement with respect thereto. The tool can be selectively operated to attach a work product disposed at one station and to transfer it to the other station where it is released. Means are further provided for moving the sweep arm along the axis of its arc of travel with the result being to impart to the gripping tool the ability to undergo compound motions of wide sweep in comparison with the size of the apparatus thus rendering it operative over a significantly greater work area than similar apparatus of comparable size.

It is therefore a principle object of the present invention to provide an improved form of mechanical work transfer device that is effective to automatically perform the functions of a workman in transferring a workpiece between plural work stations.

It is a further object of the invention to provide a relatively simple, compact work transfer apparatus that is capable of operating over a wide work area thereby enhancing its operational flexibility.

A still further object of the invention is to provide apparatus of the described type that is operative to provide high speed work transfer functions thereby reducing the period of the production machine work cycle.

For a better understanding of the invention, its operating advantages and other objects obtained by its use, reference should be made to the accompanying drawings and description which relate to a preferred embodiment of the invention.

DESCRIPTION OF THE PREFERRED EMBODIMENT

Referring to the drawings, there is illustrated an application of the present invention as it is employed in conjunction with a plastic injection molding machine of conventional design. For the sake of clarity the drawings illustrating the mechanical components of the apparatus omit several of the fluid couplings and limit switches necessary for operation of the described work transfer apparatus. These elements are disclosed in FIG. 12 of the drawing and description made thereof hereinafter in the specification.

The work transfer apparatus of the present invention, indicated generally as 10, is shown as being attached directly to the molding machine, attachment being made to the upper side edge of the stationary platen 12 thereof. As is well known, the molding machine of the form described herein comprises, in addition to the stationary platen 12, a movable platen 14 adapted for reciprocating movement to and from the stationary platen along guide rods 16 (only one of which is shown in the figure). The platens 12 and 14 each attach one half of a severable mold 18 within which the plastic material is molded to a finished product.

In the illustrated arrangement the molded product, indicated generally as P, comprises a frusto-conical base X attached to a sprue S that is disposed normal to the base. The product P is produced in a well known manner by the application of molding pressure applied to plastic material injected into a mold cavity formed when the mold halves 18 are brought into registry with one another by movement of the movable platen 14 to its extended position. In the described arrangement the finished product is retained in the mold half 18 mounted on movable platen 14 after parting of the mold halves by retraction of the movable platen. It is from this position that the product P is withdrawn and transferred to work receiving hoppers as hereinafter described.

Figure 1:
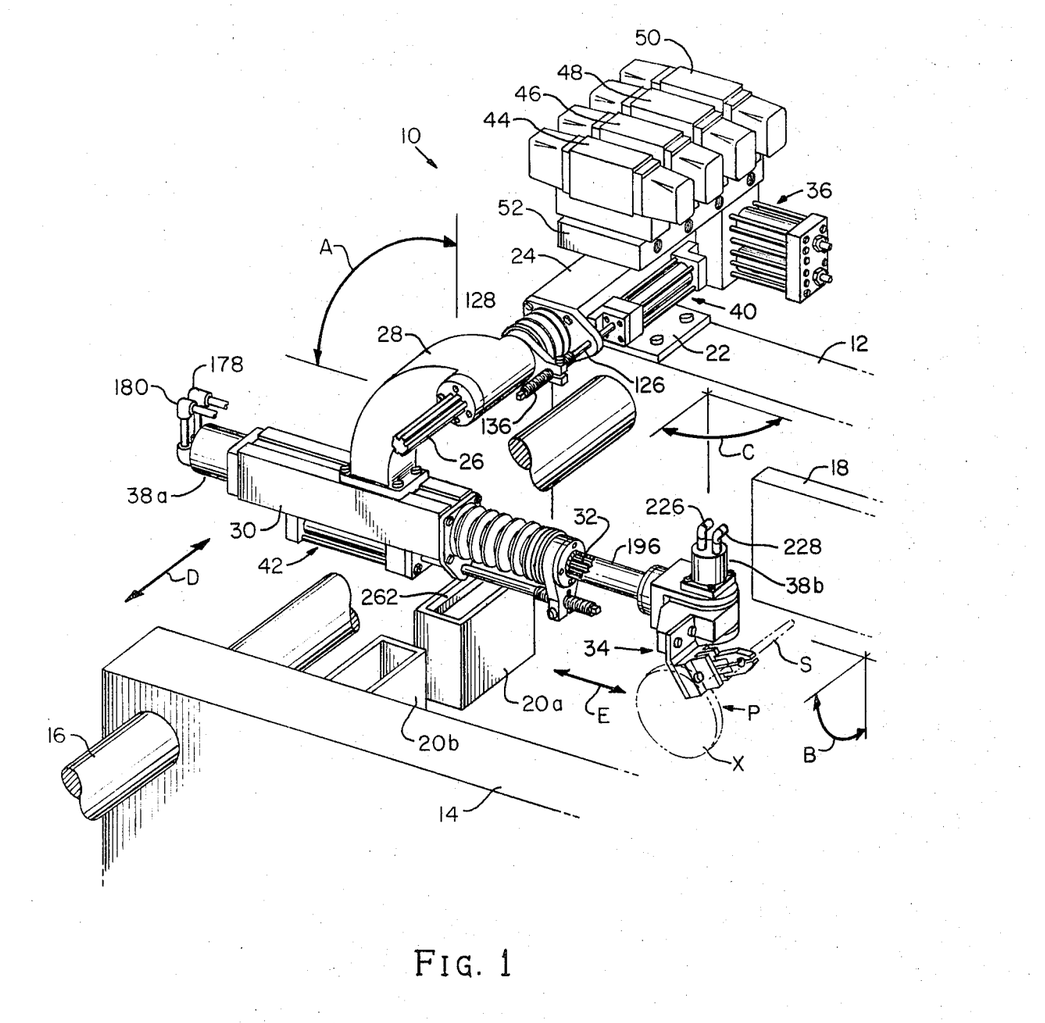
FIG. 1 is a pictorial representation of work transfer apparatus constructed according to the invention and operatively disposed on a production machine.

Going now to FIG. 1 of the drawings, the work transfer apparatus 10 is illustrated in a position representing an intermediate step in its operative cycle. This step occurs after the apparatus 10 has removed the product P from its retained position in the mold half (not shown) attached to the movable platen 14 and prior to severing and depositing the base X in one receiving hopper 20a and the severed sprue S into another receiving hopper 20b adjacent the first. Both of the hoppers 20a and 20b are located in laterally adjacent relation to the injection molding machine. The work transfer apparatus 10 comprises a base plate 22 adapted for connection by means of threaded fasteners to the upper side edge of the stationary platen 12. Superposed upon the base plate 22 is a main housing 24 formed of an elongated hollow rectangular body that is adapted to mount the operator shaft 26 of a sweep arm 28 for oscillating rotary movement. The sweep arm 28, in turn, mounts a secondary housing 30 that is an elongated hollow rectangular body similar to the main housing 24 and adapted to mount the operator shaft 32 of a gripper assembly indicated generally as 34. Each of the operator shafts are driven by rotary actuators 36 and 38a respectively while fluid motors 40 and 42 are operatively disposed to effect linear movement of the sweep arm 28 and the gripper assembly 34 with respect to their associated operator shafts. Another rotary actuator indicated as 38b, operates to impart angular movement to the gripping tool in the assembly 34 with respect to its mounting. In the described arrangement the rotary actuator 36 is operative to impart angular movement to the sweep arm 28 in a direction indicated by arrows A in FIG. 1. Rotary actuator 38a imparts angular movement in a direction indicated by arrows B while the angular movement produced by rotary actuator 38b is indicated by arrows C. Fluid motors 40 and 42 are operative to drive the components to which they are connected linearly along lines indicated by arrows D and E respectively.

The several operative functions of the components of the work transfer apparatus are regulated by solenoid actuated control valves 44, 46, 48 and 50 that are attached to the upper side of a control manifold 52 which is, in turn, mounted upon the main housing 24. The operation of these apparatus will be described in detail hereinafter in conjunction with the description of the hydraulic control system shown in FIG. 12.

Figure 2:
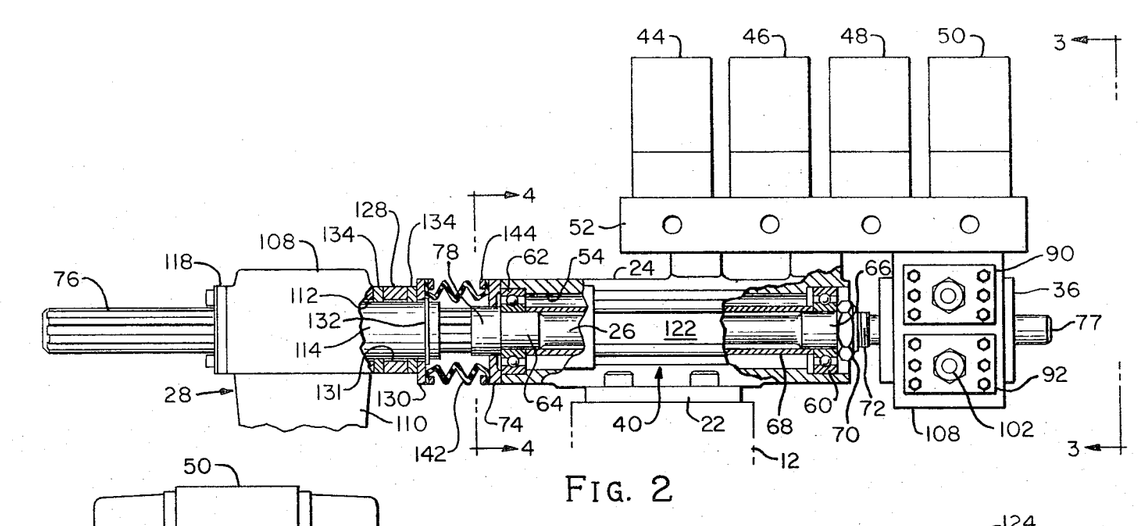
FIG. 2 is a partial elevational view, partly in section, of the main housing and sweep arm hub assemblies of the work transfer apparatus of FIG. 1.

As shown in FIG. 2, the interior of the main housing 24 contains an axial through opening 54 having enlarged counterbored portions at the opposite ends thereof for mounting the outer races of roller bearings 60 and 62. These bearings serve to mount sweep arm operator shaft 26 for oscillating rotary movement with respect to the housing 24. The inner races of the roller bearings 60 and 62 engage bearing seats 64 and 66 integrally formed on the operator shaft 26. The bearings are retained within the housing 24 in axially spaced relation by means of a concentric bearing spacer sleeve 68 that spacedly surrounds the operator shaft and whose opposite ends bear against the facing surfaces of the respective roller bearings. Retention of the assemblage is effected by the action of bearing nut 70 that is received upon an integral threaded portion 72 on the operator shaft 26 and which applies a compressive force against the inner race of bearing 60. This compressive force is applied between the bearings 60 and 62 and sleeve 68 against a shoulder provided at the opposite end of the main housing 24 by housing end cap 74 that bears against the outer race of bearing 62. Cap screws serve to attach the end cap 74 to the end of the housing body.

The sweep arm operator shaft 26 extends axially outwardly from both ends of the main housing 24. That portion of shaft 26 extending to the right of the threaded portion 72 as it is viewed in FIG. 2 is a smooth shank 77 of somewhat reduced diameter that effects connection with the rotary actuator 36 as hereinafter more fully described. That portion of the operator shaft 26 that extends from the left end of the main housing 24 contains a plurality of radial splines 76 which are operative in driving the sweep arm 28. This latter portion of the operator shaft 26 is separated from the bearing seat 66 by an enlarged diameter shoulder portion 78 which bears against the adjacent edge of the inner race of roller bearing 62 thereby to position the shaft 26 axially with respect to the main housing. The shoulder portion 78 on shaft 26 is also useful in providing a limit stop for movement of the sweep arm 28 toward the main housing 24.

Figure 3:
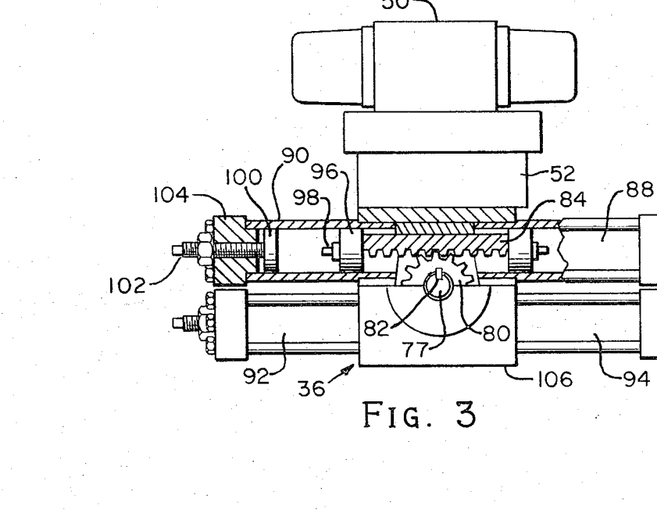
FIG. 3 is an end view, partly in section, taken along line 3—3 of FIG. 2.

The sweep arm operator shaft 26 undergoes angular movement of approximately ninety degrees by means of the hydraulic rotary actuator 36. This member is shown best in FIG. 3 and comprises a pinion 80 that is fixedly connected to the shank portion 77 of the sweep arm operator shaft 26 by a key 82. The pinion 80 is driven by a pair of racks 84 (only one of which is shown in the section of FIG. 3) that are each disposed on opposite sides of the pinion and have teeth that engage those of the pinion at diametrically opposed points. The racks 84 are each operatively disposed within a set of oppositely disposed cylinders, those indicated as 88 and 90 being associated with the upper rack and those indicated as 92 and 94 being associated with the lower rack. Opposite ends of the respective racks 84 are provided with piston members 96 which serve to drive the respective racks when operating fluid is admitted to the cylinders as hereinafter more fully described. In order to change the stroke of the racks 84 and thereby the extent of angular movement of sweep arm 28 the pistons 96 are provided with feelers 98 adapted to engage stop members 100 whose positions within the respective cylinder are capable of adjustment by means of threaded adjustment screws 102 mounted in the cylinder end caps 104. The rotary actuator structure 36 is contained within a generally rectangular containment body 106 that is suspended beneath the lower surface of the control manifold 52.

The sweep arm 28 is radially fixed to and thereby adapted for angular oscillating movement with the operator shaft 26. It comprises a hub 108 having a nexus portion 110 extending radially outwardly therefrom and attaching secondary housing 30 at its free end. The nexus portion 110 is preferably arcuately formed in its plane of travel to enable clearance between it and the adjacent guide rod 16 during operation of the sweep arm. The hub 108 is provided with a through opening 112 to receive mounting sleeve 114 that serves to mount the shaft for angular movement with the operator shaft 26. The sleeve 114 possesses a generally cylindrical external surface for concentric reception within the hub opening. A splined bore extends through the sleeve for driving coaction with the operator shaft 26. The sleeve 114 is fixedly attached to the sweep arm hub 108 by means of an end flange 118 that connects with the hub by cap screws.

In addition to the angular movement imparted to the sweep arm 28 by the operator shaft 26 the member is capable of linear movement in opposite directions along the effective length of the operator shaft, such movement being induced by the operation of fluid motor 40 operatively attached to the main housing 24. The fluid motor 40 comprises a cylinder 122 attached by brackets 124 to the side wall of the housing 24 and a piston-operated connecting rod 126 that connects with sweep arm slide yolk 128. The slide yolk 128 contains an opening 131 that loosely encircles the sleeve 114. It is held tightly between the side edge of the hub 108 and end stop washer 130 by means of a split ring retainer 132 that attaches to the end of the sleeve in an annular groove provided therein for this purpose. A pair of lubricating washers 134, formed of an oil-bearing material, or the like, are disposed on opposite sides of the yolk 128 to accommodate relative angular movement between the hub 108 and the yolk when the sweep arm 28 is actuated by the operator shaft 26. The yolk 128 is fixedly secured to the connecting rod 126 by means of a friction lock provided by split opening 127 that is brought to bear about the connecting rod by lock screw 129.

The stroke of the fluid motor 40 and thereby the length of linear travel of the sweep arm 28 along operator shaft 26 is adjustable by means of the ability to alter the position of the yolk 128 with respect to the connecting rod. This ability is provided by threads 136 on the free end of the connector rod 126 which engage an accommodating threaded opening through the split end of the yolk.

Movement of the connector rod 126 with respect to the cylinder 122 is guided by means of bracket 138 integrally formed on the main housing end cap 74. The bracket 138 contains a through opening 140 through which the connector rod 126 freely passes thereby to prevent canting of the rod that may be caused by moments induced by the action of forces acting on the yolk 128 when the sweep arm undergoes angular motion.

Figure 4:
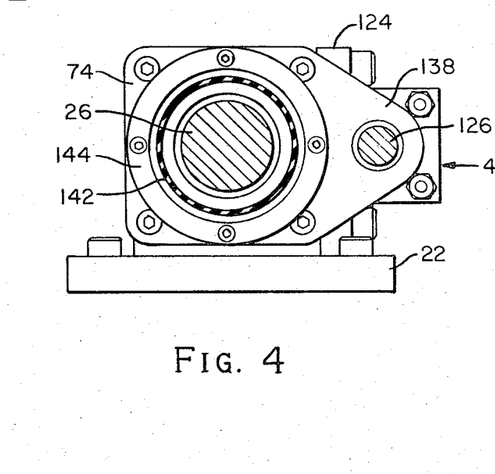
FIG. 4 is a sectional view taken along line 4—4 of FIG. 2.

A protective cover may be provided about that portion of the splined operator shaft 26 that is exposed during lateral movement of the sweep arm 28. The cover is in the form of a pleated bellows 142 formed of a resilient material, such as plastic, that encircles the shaft. Opposite ends of the bellows 142 are attached between the main housing end cap 74 and the end stop washer 130, connection being made by connector rings 144 (FIG. 4) that attach the bellows ends to the adjacent member by cap screws.

Figures 5, 6, 7, 8:
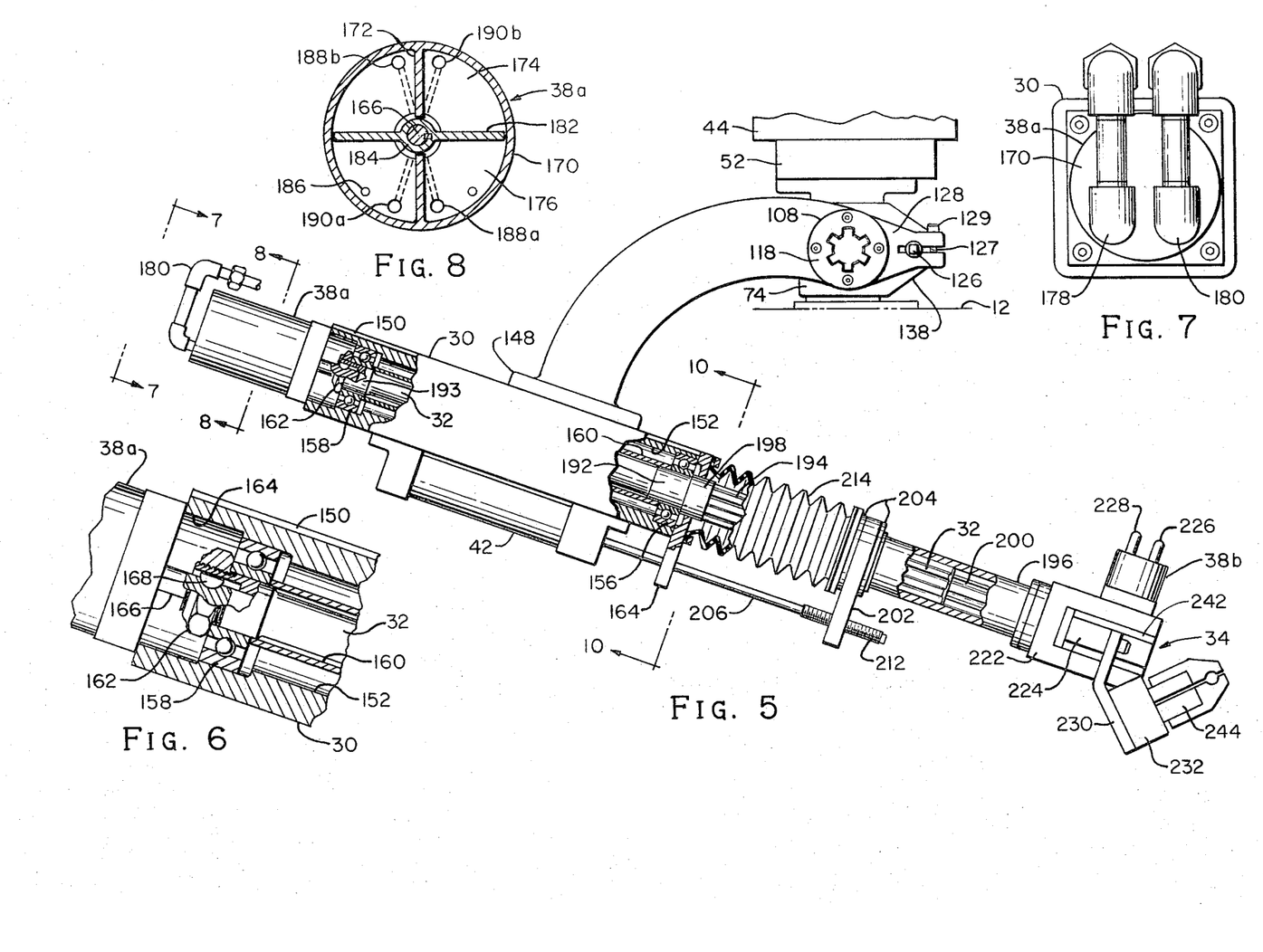
FIG. 5 is a partial elevational view, partly in section, of the secondary housing and gripper assemblies of the work transfer apparatus of FIG. 1.
FIG. 6 is an enlarged sectional view of part of the secondary housing assembly.
FIG. 7 is an end view taken along line 7—7 of FIG. 5.
FIG. 8 is a sectional view taken along line 8—8 of FIG. 5.

The secondary housing 30 is adjustably attached to the foot 148 of the nexus portion 110 of sweep arm 28 by means of a tongue and groove assembly consisting of a tongue 149 on the foot that engages groove 150 on the upper surface of the housing. As shown in the drawings the secondary housing 30 is angularly disposed with respect to the sweep arm 28 being arranged with its longitudinal axis extending substantially normal to that of the main housing 24. The secondary housing 30 is similar in construction to the main housing 24 and includes a rectangular body having an axial through opening 152, the ends of which contain axially spaced counterbores for mounting roller bearings 156, 158. The bearings 156, 158 serve to mount gripper tool operator shaft 32 for oscillatory angular movement. Within the interior of the housing spacer sleeve 160, similar to the sleeve 68 in the main housing 24, retains the bearings 156, 158 in cooperation with lock nut 162 that engages threads on the rear end of the operator shaft 32 and places the assembly in compressed relation against a shoulder presented by the end cap 164 which closes the end of the housing 30.

The gripping tool operator shaft 32 that operates within the secondary housing 30 contains an axial recess 164 at its rear end for connection of the drive shaft 166 of rotary actuator 38a by means of key 168. The rotary actuator 38a as well as rotary actuator 38b each comprise a hollow cylindrical casing 170 having an integrally formed diametral divider 172 which separates the interior of the casing into two distinct chambers 174, 176. Fluid couplings 178, 180 are operative to connect the casing interior to the hydraulic fluid system. A rotatable vane 182 is mounted upon the shaft 166 within a central hub 184 and is adapted to rotate in opposite directions through about ninety degrees. Limit pins 186 are provided as stops to limit the rotational movement of the vane 182 and thereby the drive shaft 166. As shown, the fluid couplings 178 and 180 connect with each of paired ports 188a, 188b and 190a, 190b to admit and release hydraulic fluid to and from opposite sides of the vane 182 for rotating the same in opposite directions.

With exception to its aforementioned end the gripping tool operator shaft 32 is similar in structure to the sweep arm operator shaft 26. As shown in FIG. 5 it contains axially spaced bearing seats 192, 193 for reception of the inner races of the roller bearings 156, 158. The opposite end portion of the shaft 26 contains radial splines 194 for reception of gripping tool operator sleeve 196. An enlarged diameter shoulder portion 198 separates the splined portion of the shaft 32 from bearing seat 190. This shoulder portion 198, in addition to serving as an abutting surface for roller bearing 156 also provides, at its opposite side, a limit stop for movement of operator sleeve 196 along the operator shaft.

The gripping tool operator sleeve 196 contains internal splines 200 for coaction with splines 194 on shaft 32. At its leading end the sleeve attaches the gripping tool assembly 34 which is described in detail hereinafter.

Slide yolk 202 similar to the slide yolk 128 previously described is connected to the operator sleeve 196 between lubricated washers 204 and operates to extend or withdraw the sleeve along the shaft 32 in response to operation of fluid motor 42. The yolk 202 is attached to the connecting rod 206 of fluid motor 42 by means of a friction lock identical to that employed to attach yolk 128 to its associated connecting rod 126. As in the case of the earlier described housing structure, the secondary housing end cap 164 contains integrally formed bracket 208 having a clearance opening 210 for guiding movement of connecting rod 206. Threads 212 on the end of connecting rod 206 coact with associated threads on yolk 202 to effect adjustment of the effective stroke of fluid motor 42. A protective covering in the form of pleated bellows 214 surrounds splines 194 on operator shaft 32, having its opposite ends connected to end cap 164 and stop washer 216 by means of connector rings 218 and attaching screws.

The gripper assembly 34 is secured to the leading end of the operator sleeve 196. This assembly includes mounting yolk 222 that is fixedly attached to the sleeve 196 and possesses oppositely spaced arms between which drive mount 224 is mounted for angular movement by rotary actuator 38b. Rotary actuator 38b is similar in function and configuration to rotary actuator 38a and has fluid inlet nozzles 226, 228 for admitting and releasing operating fluid to and from opposite sides of the vane therein.

Figure 9:
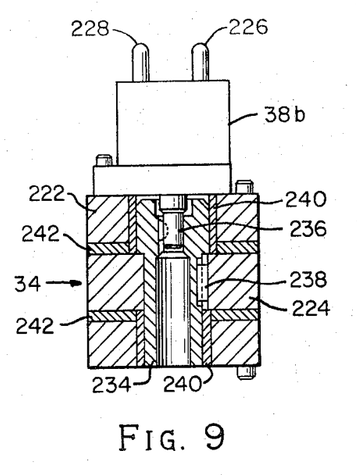
FIG. 9 is a sectional view of the gripper drive assembly utilized in the described work transfer apparatus.
Figure 10:
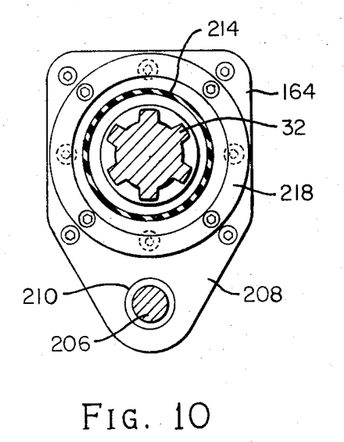
FIG. 10 is a sectional view taken along line 10—10 of FIG. 5.

The drive mount 224 attaches mounting bracket 230 which connects the gripping tool 232 to the drive mount. As shown best in FIG. 9, the connection between the drive mount 224 and the rotary actuator 38b is effected by means of adapter sleeve 234 that is keyed to the rotary actuator drive shaft 236 and which attaches the drive mount by means of key 238. Lubricated bushings 240 and bearing washers 242 are interposed between the respective members to lend stability to the structure as well as to lubricate the interfaces between the relative moving parts.

The particular gripping tool 232 employed in the illustrated arrangement does not form part of the present invention as it is only one of several diverse forms of tool arrangements which can be adapted for use with the work transfer apparatus of the invention. The illustrated gripping tool 232 is manufactured by A. G. Russel Co., Bristol, Connecticut under catalog number AGR Gripper DP-2A. It is a pneumatically actuated device having normally open jaws 244 that are actuated to a closed position about the workpiece P upon admission of motive fluid through fitting 246. Springs (not shown) are operative to expand the jaws 244 to their open position upon termination of the flow of motive fluid to the device.

Figure 11:
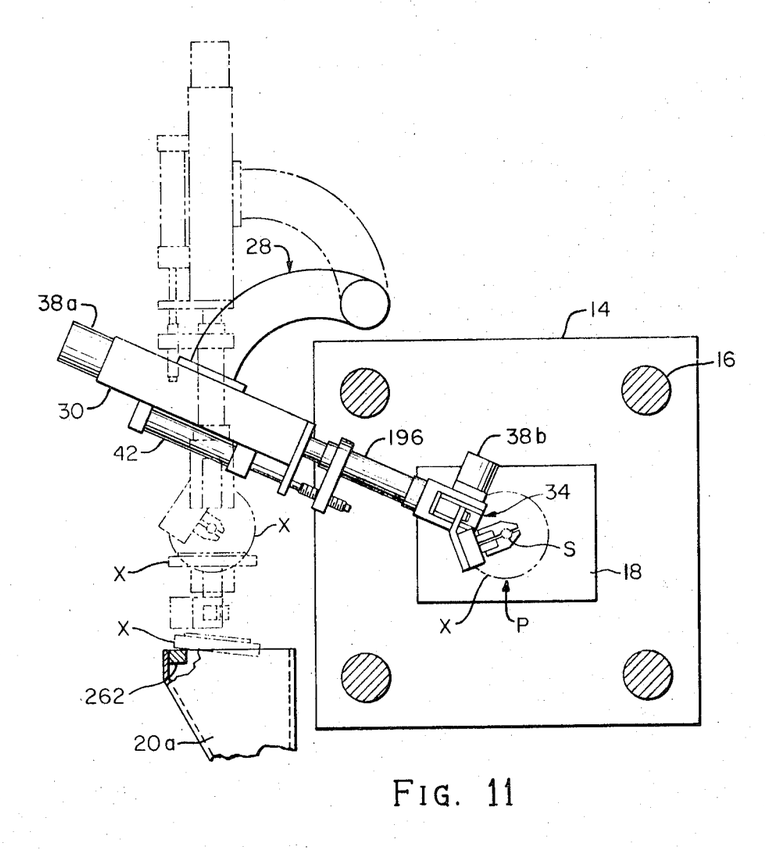
FIG. 11 is a somewhat schematic end view of the work transfer apparatus illustrated in various of its operative positions.
Figure 12:
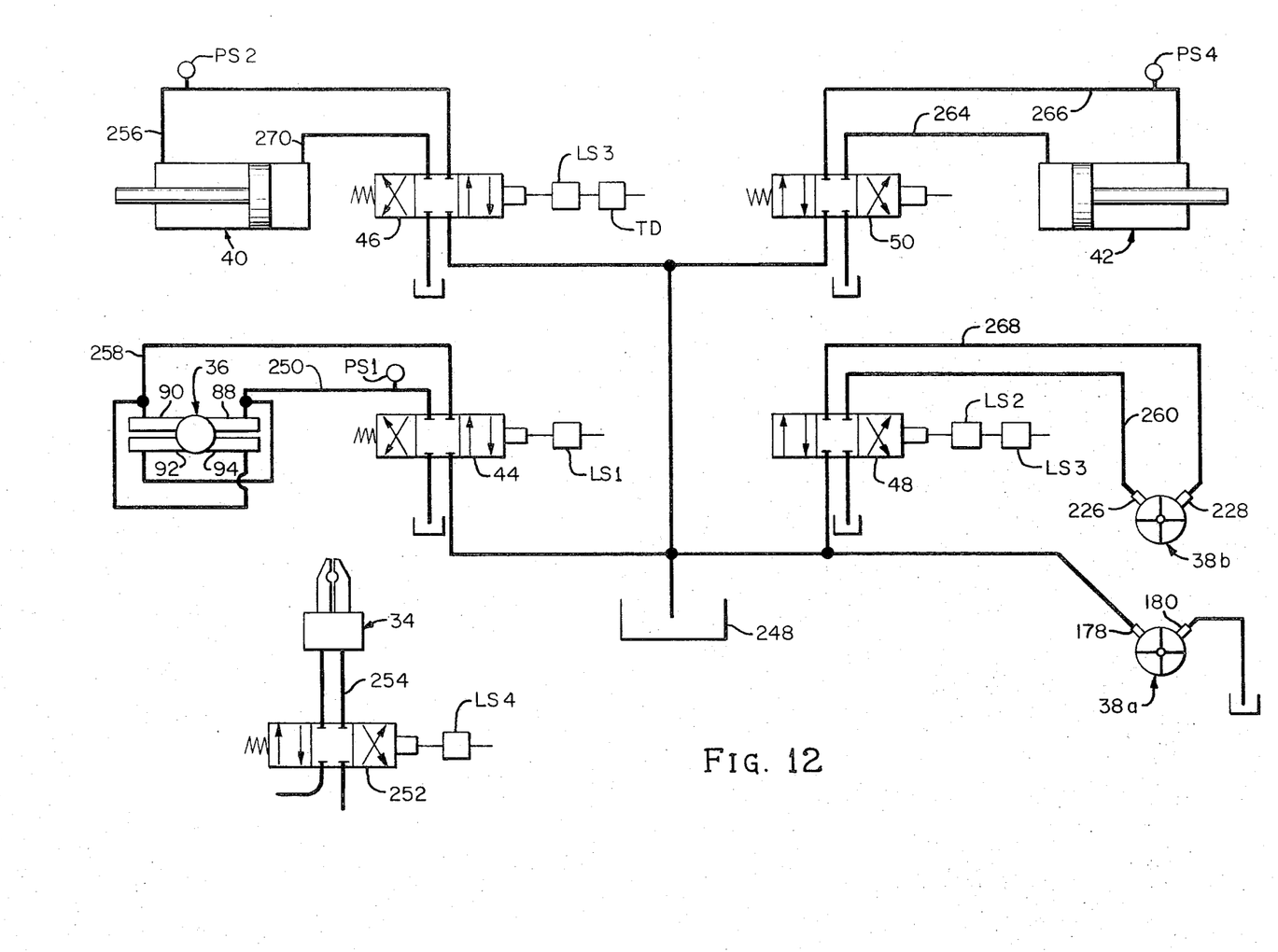
FIG. 12 is a schematic representation of the fluid system utilized in the control of the work transfer apparatus.

The operation of the work transfer device of the present invention will be discussed in conjunction with the circuit diagram of FIG. 12. The operating procedure is initiated with the apparatus 10 disposed outwardly of the operating region of the mold press as shown in phantom in FIG. 11, and with the sweep arm 28 in its forward position on operator shaft 26. As the movable platen 14 moves to its full open position following the production of a molded product P, which product is retained in the mold half 18 carried by the movable platen, a limit switch LS1 is actuated energizing the operating solenoid on control valve 44. This action opens the valve to admit operating fluid from sump 248 to cylinders 88 and 92 of rotary actuator 36 thereby actuating racks 84 to rotate operator shaft 26 in the clockwise direction as it is viewed in FIG. 11. The shaft 26 rotates an amount to place the jaws 244 of gripping tool 232 in a position to receive the sprue S of product P. Following the racks 84 reaching the predetermined limit of their travel pressure increases in fluid line 250 to a level whereby pressure switch PS1 is actuated. Actuation of pressure switch PS1 energizes the operating solenoid in control valve 252 to admit operating fluid through line 254 to the gripping tool 232 whereby the jaws 244 thereof are closed about the sprue S. Simultaneously with this action a time delay relay TD is energized. This relay is connected in the electrical operating circuit of control valve 46 and operates to energize the operating solenoid of this valve about one half second after the jaws 244 are closed about the sprue S. Energization of this solenoid opens control valve 46 to admit operating fluid to fluid motor 40 through line 256 causing retraction of its connecting rod 126 and with it, slide yolk 128 and sweep arm 28 upon operating shaft 26. This action withdraws the product P from the mold half 18 and locates it in a position removed from the mold, such position being in lateral alignment with receiving hopper 20a that is adapted to receive product body X. The time delay between closing of the jaws 244 and actuation of fluid motor 40 insures retention of the product P by the gripping tool prior to withdrawal of the product from the mold.

After the sweep arm 28 reaches its fully retracted position fluid pressure in line 256 increases to actuate pressure switch PS2. This pressure switch operates to deenergize the operating solenoid in control valve 44 to return the fluid in line 250 to the sump 248 and simultaneously pass motive fluid through line 258 to cylinders 90 and 94 of the rotary actuator 36. This action causes racks 84 to operate shaft 26 in the counterclockwise direction thereby rotating the sweep arm 28 into the position shown in phantom in FIG. 11. With the apparatus in this position the product P is retained in vertical alignment with hopper 20a but with the sprue S disposed in a horizontal attitude.

Rotation of operator shaft 26 to its full counterclockwise position effects actuation of limit switch LS2 to energize the operating solenoid of control valve 48 thereby admitting operating fluid through line 260 to rotary actuator 38b. The admission of operating fluid to rotary actuator 38b causes the vane 182 therein to rotate drive shaft 236 about 90° thus moving the gripping tool 232 into a position over hopper 20a in which the sprue S is in a vertical attitude and base X overlies breaker bar 262.

As fluid pressure increases in line 260 following the vane 182 reaching its limit pins 186 (FIG. 8) pressure switch PS3 is actuated to energize the operating solenoid in control valve 50 to admit operating fluid through line 264 to fluid motor 42. Admission of operating fluid from line 264 causes the connecting rod 206 associated with fluid motor 42 to extend and thereby move slide yolk 202 and gripping tool 232 holding the retained product P downwardly such that base X is impacted against breaker bar 262. By this action base X is severed from sprue S and falls into hopper 20a.

When connecting rod 206 reaches its full forward position fluid pressure increases in line 264 to actuate pressure switch PS4. Pressure switch PS4 is operative to deenergize the operating solenoid associated with control valve 50 to release the fluid from line 264 and simultaneously admit it to line 266 whereupon fluid is admitted to the alternate side of the piston operating in fluid motor 42 thereby moving the gripper assembly 34 with the retained sprue S to its retracted position on operator shaft 32.

Upon the gripper assembly 34 reaching its fully retracted position limit switch LS3 is actuated to deenergize the operating solenoid on control valve 46. This releases fluid from line 256 and admits fluid to line 270 in order to extend connecting rod 126 in fluid motor 40 to move the sweep arm 28 forward along its operator shaft 26 such that the gripper assembly 34 overlies hopper 20b.

Actuation of limit switch LS3 simultaneously deenergizes the operating solenoid on control valve 48 to release fluid from line 260 and to pass the same through line 268 thereby effecting retrograde rotation of the drive shaft 236 of rotary actuator 38b. Thus, actuator 38b undergoes angular motion to return to its original position as the sweep arm 28 is moving forward under the action of fluid motor 40. When the sweep arm 28 reaches its fully extended position limit switch LS4 is actuated to deenergize the operating solenoid of control valve 252 thereby releasing operating fluid from the gripping tool 232 to effect opening of the jaws 244 and release of the sprue into hopper 20b.

It will be appreciated that, because the operating cycle of the work transfer apparatus terminates in this position, the apparatus is disposed in the start position of the next operating cycle.

It should further be appreciated that in the work transfer apparatus operating cycle described herein the rotary actuator 38a attaching operator shaft 32 remains inactive throughout the entire cycle. This inactivity in the described operating cycle is engendered by the lack of need for operator shaft 32 to undergo rotational movement during the described cycle. It should be obvious, however, that the ability of the tool to undergo angular motion in the direction of arrows B in FIG. 1 is present in other operating cycles that may require the same.

While the preferred embodiment of the present invention has been described herein, it should be understood that the description is merely illustrative and that variations and modifications can be made therein without departing from the spirit and scope of the invention as recited in the following claims.

What is claimed is:

1. Apparatus for the transfer of work between two mutually spaced stations comprising:
   a. a stationary main housing;
   b. an operator shaft mounted in said main housing for rotational movement between two angularly spaced positions;
   c. a sweep arm extending in a plane substantially normal to the axis of said operator shaft;
   d. means connecting one end of said sweep arm to said operator shaft for rotational motion therewith and for linear movement longitudinally of said operator shaft;
   e. a work gripper assembly including a work gripper tool operatively connected to the other end of said sweep arm, said assembly further including means for operating said work gripper tool to engage a workpiece with said sweep arm disposed in one of said angularly spaced positions and to release said workpiece with said sweep arm disposed in the other of said angularly spaced positions;
   f. drive means operatively connected to said sweep arm and said operator shaft to impart angular movement to said sweep arm between said two angularly spaced positions and linear movement to said sweep arm between two longitudinally spaced positions along said operator shaft; and
   g. means for sequentially actuating said drive means to locate said gripper tool at one of said stations during one phase of its operating cycle and at the other of said stations during another phase of said operating cycle.

2. Apparatus as recited in claim 1 including a splined interconnection between said operator shaft and said one end of said sweep arm and said drive means includes a fluid motor connected between said main housing and said sweep arm for imparting said linear movement thereto.

3. Apparatus as recited in claim 2 including means associated with said fluid motor for selectively adjusting the extent of linear movement of said sweep arm with respect to said main housing.

4. Apparatus as recited in claim 1 including a secondary housing fixedly attached to the other end of said sweep arm for connecting said work gripper assembly thereto and said drive means includes means for imparting linear motion to said assembly in relation to said secondary housing.

5. Apparatus as recited in claim 4 wherein said linear motion imparting means includes a second fluid motor connected between said secondary housing and said gripper assembly.

6. Apparatus as recited in claim 5 including means associated with said second fluid motor for selectively adjusting the extent of linear movement of said gripper assembly with respect to said secondary housing.

7. Apparatus as recited in claim 4 including a second operator shaft operatively disposed in said secondary housing and extending in a plane substantially perpendicular to the plane of said first operator shaft and means for slidably attaching said gripper assembly to one end of said second operator shaft.

8. Apparatus as recited in claim 7 including a sleeve member telescopically disposed on the end of second operator shaft, said gripper assembly attached to the end of said sleeve, and a splined interconnection between said second operator shaft and said sleeve.

9. Apparatus as recited in claim 8 in which said drive means includes means for selectively rotating said second operator shaft.

10. Apparatus as recited in claim 8 in which said gripper assembly includes a gripper tool mount connected for pivotal movement to said sleeve and said drive means includes means for selectively pivoting said gripper tool mount with respect to said sleeve.

11. Apparatus for the transfer of a workpiece containing frangible parts from a production station to at least two spacedly disposed receiving stations for accepting each of said parts, said apparatus comprising:

a. a stationary main housing;
b. an operator shaft mounted in said main housing for rotational movement;
c. a work gripper assembly including a gripping tool and means for operating the same to engage said workpiece when said tool is operatively disposed at said production station and to release said workpiece when said tool is operatively disposed at one of said receiving stations;
d. a sweep arm extending in a plane substantially normal to the axis of said operator shaft, one end of said sweep arm connecting said work gripper assembly and the other end being attached for rotational movement with said operator shaft and for linear movement therealong;
e. first drive means for rotating said operator shaft between two angularly spaced positions, one of which locates said gripping tool at said production station and the other locates said gripping tool at said one receiving station;
f. second drive means for linearly moving said sweep arm along said operator shaft a distance equal to the space between said two receiving stations;
g. third drive means for linearly moving said work gripper assembly with respect to said end of said sweep arm; and
h. control means for sequentially actuating said drive means for operating said work gripper assembly for gripping said workpiece, for severing the parts thereof, and for depositing said parts to the respective receiving stations.

* * * * *